UNITED STATES PATENT OFFICE.

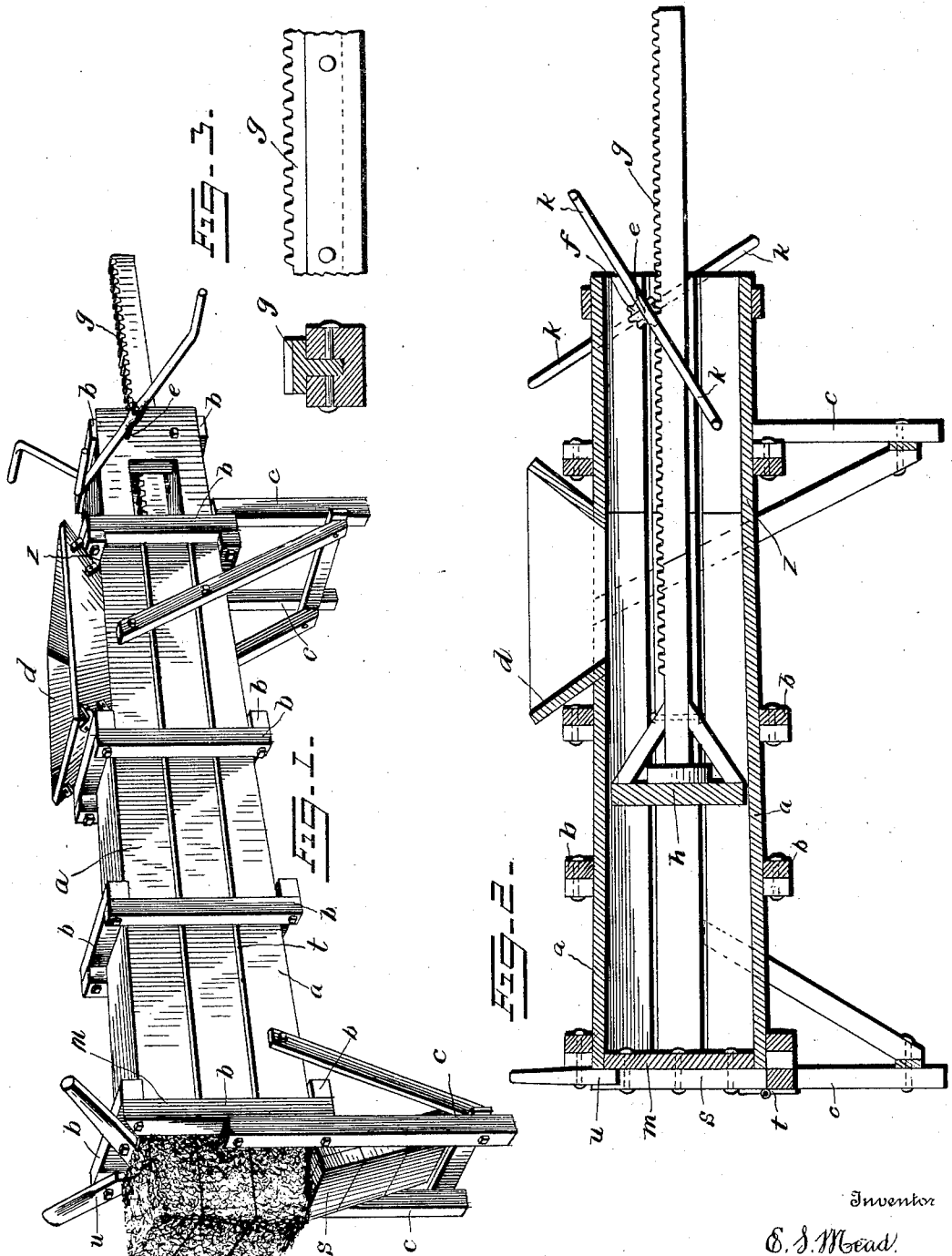

EGBERT S. MEAD, OF WINONA, MINNESOTA.

HAY-BALING PRESS.

SPECIFICATION forming part of Letters Patent No. 707,709, dated August 26, 1902.

Application filed October 23, 1901. Serial No. 79,685. (No model.)

*To all whom it may concern:*

Be it known that I, EGBERT S. MEAD, a citizen of the United States, and a resident of Winona, in the county of Winona and State of Minnesota, have made a certain new and useful Invention in Hay-Baling Presses; and I declare the following to be a full, clear, and exact description of the same, such as will enable others skilled in the art to which it appertains to make and use the invention, reference being had to the accompanying drawings, and to letters of reference marked thereon, which form a part of this specification.

Figure 1 is a perspective view of my press with door open. Fig. 2 is a longitudinal section of the same with door closed. Fig. 3 illustrates the manner of connection of the rack with the press-head.

The invention has relation to hand-presses for baling hay, straw, shavings, &c.; and it consists in the novel construction and combinations of parts, as hereinafter set forth.

In the accompanying drawings the letter $a$ designates a longitudinal rectangular closure, preferably of wood, which is open at each end and is made secure against interior expansion by means of the ribs $b\ b$, which are placed at intervals along its length. The box is of tapered form, the taper being from the driven or pressed end $m$ to the driving end $z$.

$c\ c$ are supports for the box or closure, and $d$ is a hopper arranged in connection with its top near the driving end. At the driving end is arranged in suitable bearings the transverse shaft $e$, carrying a pinion $f$, which engages the rack extension $g$ of the plunger or press head $h$. The transverse shaft $e$ is operated by means of the crank-handles $k\ k$, which are arranged on each side of the box in order that two persons can work in driving the plunger-head home at the same time.

At the end $m$, against which the pressing is effected, a door $s$ is provided, which is mounted on hinges $t$ and is designed to swing downward when said door is opened. When closed into its seat on the end of the box or closure, the door is locked in place by means of the latches $u$, which hold it securely in position against the expansive strain of the material being pressed.

In operating this press the door is opened and the press-head run back by means of the driving-shaft and pinion. Then the box is filled through the mouth at $m$ with the hay and the door closed. The operators then turn the pinion-shaft and move the press-head against the hay until it is forced into the pressed end of the box. Then the press-head is run back to the rear again and more hay is introduced into the box through the hopper $d$, after which the press-head is driven forward again, forcing the additional quantity of hay into the pressure end or chamber of the box. This operation is repeated until the bale is of sufficient size, when it is tied by means of wire or cord introduced through openings $t$ in the walls of the press-chamber.

The hay is prevented from expanding to the rear after each pressure in the press-box by the tapering form of the interior of said box, which causes a forcible engagement between the walls of the box and the laterally-expanding hay, holding it in position. The confinement of the pressed hay on all sides by the wedging walls of the box is quite sufficient to hold the bundle in place in the pressure-chamber while the press-head is operated to pack in an additional amount in order to bring the bale to full size.

The press is light, strong, durable, and easily operated, and it can be readily moved about, as it is not necessary to fasten it down to place.

The chamber of the box has a flare from the admission-opening in the hopper toward the end abutment or door $m$, whereby the hay wedges itself against return when the plunger is withdrawn.

Having described this invention, what I claim, and desire to secure by Letters Patent, is—

1. In a baling-press, the longitudinal closure or box having an admission-opening for the hay, and an end abutment, the chamber of such box having a flare from admission-opening to abutment, substantially as specified.

2. The hand hay-press, consisting of the longitudinal box, having a door forming an end abutment, the chamber of such box having a flare toward such abutment, substantially as specified.

3. The hand hay-press, consisting of the longitudinal box having a door forming an end abutment, a hopper near one end, the press-head having a rack extension, and the cranked shaft carrying a pinion in mesh with such rack, the chamber of such box having a flare toward such abutment, substantially as specified.

In testimony whereof I affix my signature in presence of two witnesses.

EGBERT S. MEAD.

Witnesses:
M. E. BROWN,
A. J. MUMFORD.